United States Patent
Ball

[15] 3,656,340
[45] Apr. 18, 1972

[54] CELL PRESSURE-SENSING BATTERY CASE
[72] Inventor: James V. Ball, Sunnyvale, Calif.
[73] Assignee: The United States of America as represented by the Secretary of the Air Force
[22] Filed: Sept. 22, 1970
[21] Appl. No.: 74,345

[52] U.S. Cl. ........................ 73/88.5 R, 73/398 AR, 136/182
[51] Int. Cl. .......................................................... G01b 7/18
[58] Field of Search ................... 73/52, 88.5 R, 389, 398 AR; 136/182; 340/249, 285

[56] References Cited

UNITED STATES PATENTS

| | | | |
|---|---|---|---|
| 2,602,133 | 7/1952 | Gard | 73/398 AR X |
| 2,608,089 | 8/1952 | Raymond et al | 73/52 |
| 3,314,823 | 4/1967 | Balaguer | 136/166 |
| 3,321,332 | 5/1967 | Vignini | 136/166 |

Primary Examiner—Charles A. Ruehl
Attorney—Harry A. Herbert, Jr. and Arsen Tashjian

[57] ABSTRACT

A pressure-sensing means for use with a battery case structure having a plurality of juxtaposed cells positioned therein. A strain gauge means is attached to one structural member of the battery case such that a pressure build-up in any one or more of the cells produces a corresponding tension force in the structural member thereby indicating the highest pressure developed in the cells.

4 Claims, 2 Drawing Figures

PATENTED APR 18 1972 3,656,340

INVENTOR.
JAMES V. BALL
BY Harry A. Herbert Jr.
and
Arsen Tashjian
ATTORNEYS

3,656,340

CELL PRESSURE-SENSING BATTERY CASE

BACKGROUND OF THE INVENTION

This invention relates to a battery case structure having a cell pressure-sensing means incorporated therein and, more particularly, the invention is concerned with providing a means for detecting pressure build-up in the cells of a battery by measuring the tension stress in one of the structural members of the battery case.

In the design and fabrication of a battery having a plurality of sealed cells, it is necessary to provide means for monitoring and controlling the pressure build-up in the cells caused by the formation of gas therein. This is especially important in the operation of batteries of gas-tightly enclosed cells or galvanic elements which are located in remote areas, such as in outer space as a source of energy in a spacecraft. In most instances, space vehicles are unmanned, therefore, it is desirable to include pressure monitoring or limiting equipment in a battery for use thereon which will operate to restrain the cells under high average pressures of up to 150 psia that may develop during strenuous cycling.

The problem arises in order to prevent bulging of adjacent cells in the battery case as a result of pressure build-up in one or more of the cells particularly at higher temperatures. Also, there is the possibility that a cell or charge control system malfunction can lead to uncontrolled pressure build-up. Therefore, it would be most desirable to incorporate a pressure limiting feature in the sealed battery case design to prevent the above-mentioned problems from causing failure of the energy source. The monitoring or limiting equipment preferably should add little or no additional weight and not appreciably weaken the structure of the battery case.

SUMMARY OF THE INVENTION

The present invention provides a battery case for cells which are gas-tightly sealed and which includes a cell pressure-sensing means attached thereto for detecting pressure build-up caused by gas formation or other reasons. The pressure-sensing means is a structural member on the battery case which serves to accurately reflect in terms of strain build-up the pressure which develops inside the most highly pressurized of the cells.

Basically, the battery case aligns and restrains the cells so that the cell faces do not bulge. The face is the surface of the cell most susceptible to distortion with pressure rise. Even at 150 to 200 psi, very little distortion occurs at the bottom, top, and edge of the cell. The particular configuration according to the invention, however, allows the tension in the rectangular structural members across the top of the battery case to be related to the pressure in the cell which has the highest pressure.

This is accomplished by providing a rigid body including end plates, brackets, and longitudinal bars. The cell walls are separated by heat sink fins positioned between adjacent cells and which are ideally pivotally attached at the lower ends so as to be easily flexed through small angles. The tops and bottoms of the cells are rigid and operate to make the cells substantially incompressible. A base plate is provided under the cell bottoms and includes upstanding end portions which contact the end plates through pivots at the lower ends thereof. This arrangement reflects the fact that very little cell restraint is provided solely by the end plates attached to the base plate.

Accordingly, it is an object of the invention to provide a battery case structure which includes a pressure monitoring device to indicate the maximum pressure in the cells.

Another object of the invention is to provide a pressure-sensing means on a battery case structure wherein a resistance-type strain gauge is attached to one structural member of the battery case to produce a signal which is proportional to the pressure build-up in the cells of the battery.

Still another object of the invention is to provide a pressure-sensing battery case structure especially suited for a gas-tight cell wherein a tension force is applied to one structural member of the battery case in response to pressure build-up in one or more of the cells. The tension in the structural member corresponds to the force developed by the cell with the highest pressure.

A further object of the invention is to provide a cell pressure-sensing battery case wherein electrical circuit means are provided which serves to give an output voltage when a specific magnitude of strain develops in the top longitudinal member of the battery case as the result of cell overpressure.

These and other objects, features, and advantages will become more apparent after considering the following description taken in conjunction with the annexed drawing and appended claims.

DESCRIPTION OF A PREFERRED EMBODIMENT

Figure 1:
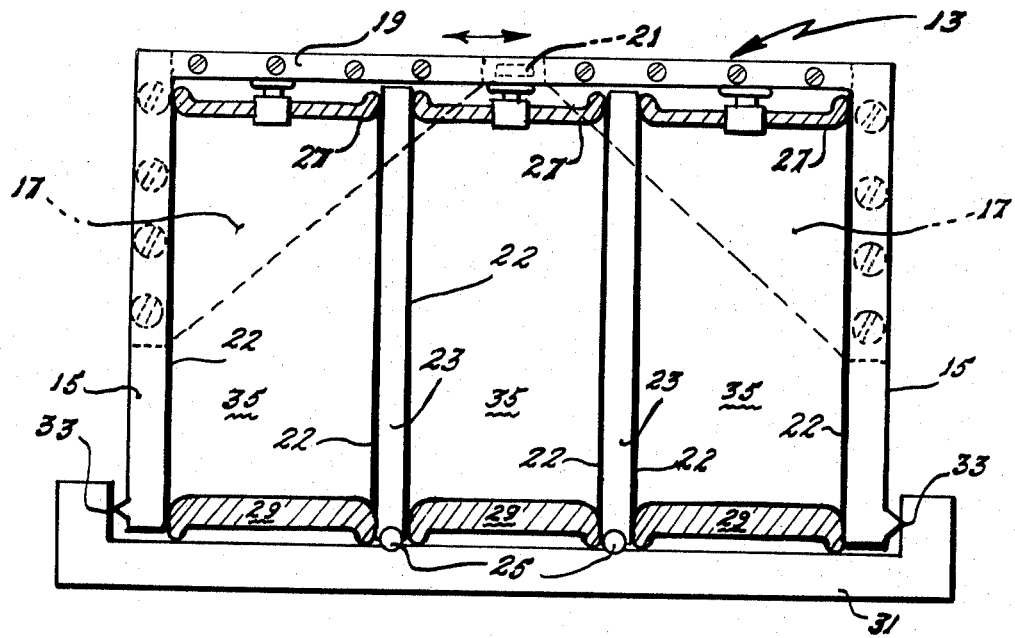
FIG. 1 is a schematic view of a side elevation of a battery case according to the invention showing the cells which include cell walls and heat sink fins in idealized representation to indicate the action of the forces on pressurization of the gas-tight cells.

Referring now to the drawings, there is shown in idealized form a battery case structure which includes a rigid body 13 made up of end plates 15, brackets 17, and longitudinal bars 19. Silicon strain gauges 21 are attached on each side of the central portion of the longitudinal bars 19. The cell walls 22 of the individual sealed cells are separated by heat sinks 23 whose attachment at the base is represented by the hinge 25 indicating that the heat sinks 23 are easily flexed through small angles. The top members 27 and the bottom members 29 are rigid and serve along with the edges (not shown) to make the cells substantially incompressible. A base plate 31 supports the battery case, and as ideally represented, includes the pivot arrangement 33 at its outer ends to indicate that very little cell restraint can be provided solely by the end plates 15 attached to the base plate 31, no matter how rigid the connection. The area 35 represents the interior of the cell where pressure is developed.

Figure 2:
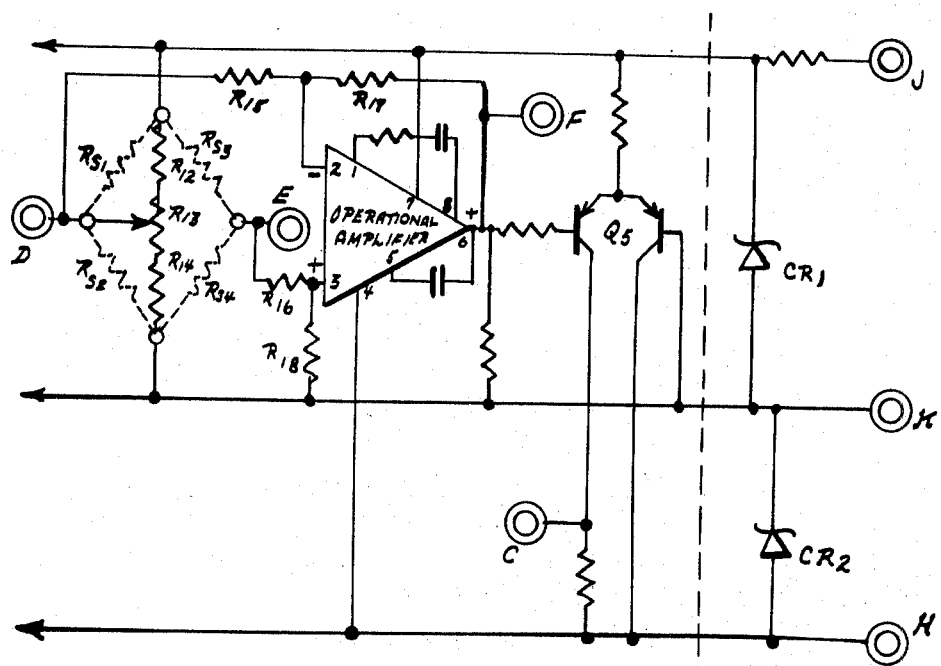
FIG. 2 is a circuit diagram of the overpressure indication portion of the electronic circuitry for measuring the strain which develops in the battery case structural member having the strain gauge attached thereto.

In FIG. 2, there is shown an electronic circuit diagram of the indicating means which gives an output when a specific magnitude of strain develops in the longitudinal bars 19 of the battery case as a result of cell overpressure. The strain gauge bridge is formed by two temperature-compensated bridge halves $R_{S1}$, $R_{S2}$ and $R_{S3}$, $R_{S4}$.

The resistors $R_{12}$, $R_{13}$, and $R_{14}$ form a biasing network used to initially unbalance the bridge. $R_{13}$ is adjusted to make the output voltage across terminals D and E negative. This negative voltage is amplified and inverted by a standard differential operational amplifier (Motorola MC170900) with a gain of 20, as determined by the ratio of $R_{17}$ to $R_{15}$ (since $R_{17} = R_{18}$ and $R_{15} = R_{16}$). The resultant positive amplifier voltage at F with respect to voltage at K keeps the transistor $Q_5$ biased off so that no output appears at C.

As strain develops in the battery case, $R_{S1}$ and $R_{S4}$ decrease, while $R_{S2}$ and $R_{S3}$ increase so that the voltage DE becomes less negative. When voltage DE crosses zero and goes positive, the voltage at F goes negative with respect to the voltage at K and transistor $Q_5$ is biased on, resulting in an output at C.

The voltage DE offset provided by $R_{13}$ can be as much as 115 MV (plus or minus) when $R_S$ is a semiconductor strain gauge bridge having a resistance of 350 ohms per leg. If additional negative voltage offset is needed, resistance can be added in series with $R_{S1}$ and $R_{S4}$. In general, the negative voltage DE offset required is equal to the strain gauge bridge differential voltage between zero cell pressure and maximum cell pressure.

The voltage of plus or minus 6.2 volts required for the operation of the circuit is provided by applying 15 volts between J and H or by applying 28 volts to J through a 220-ohm resistor. The voltage is stabilized by two reference diodes CR1 and CR2.

MODE OF OPERATION

The battery case aligns and restrains the cells so that cell faces do not bulge. The face is the surface of the cell most susceptible to distortion with pressure rise. Even at 150 to 200 psi very little distortion occurs at bottom 29, top 27, and edge (not shown) of the cell. The particular configuration according to the invention allows the tension in the longitudinal bars 19 to be related to the pressure of the cell which has the highest pressure.

This can be shown by considering the following conditions. The center cell develops a pressure $P_1$. Because the cell faces cannot in and of themselves resist the force due to internal pressure, all of the pressure is converted to force $F_1$ equal to $P_1 A$ (where A is the area of the cell force). This force can be envisioned as appearing at the center of the cell walls 22. Since the heat sinks 23 easily flex at their base portion in the region 25, a force equal to one-half $F_1$ is applied to the outer cell tops 27 through which it is transferred to the structure at the upper ends of the end plates 15. To restrain the force, a tension of $F_T$ equal to one-half $F_1$ is developed in the longitudinal bar 19 at the gauge 21 so that the tension in the bar 19 is directly related to the pressure $P_1$.

If the pressure in one of the outer cells is greater than $P_1$, the pressure in the center cell, compression is transmitted through the incompressible top 27 of the middle cell and $F_T$ is now directly related to the pressure in the outer cell. Thus, it can be seen that the tension in longitudinal bar 19 is due solely to the force developed by the cell with the highest pressure.

Readout of $F_T$ is obtained from the strain gauge 21 on the bar 19. Since the two longitudinal bars 19 share the load equally, only one need be instrumented. Also, all forces developed at the base of the cell case cancel out, regardless of magnitude, without affecting the other forces. The use of strain gauges on both sides of the longitudinal bar 19 eliminates false outputs due to bending of the bars 19.

Because the strain levels measured are generally very low, the longitudinal bars 19 in an actual six- or seven-cell battery module are reduced in thickness and narrowed at the strain gauge location 21. This, coupled with the use of highly sensitive semiconductor strain gauges, greatly increases the strain gauge bridge output voltage so that a simple amplifier can be used. The ratio of battery case strain to cell pressure must be experimentally determined for a given type of cell, since some pressure restraint is always provided by the cell wall itself.

Although the invention has been illustrated in the accompanying drawings and described in the foregoing specification in terms of a preferred embodiment thereof, the invention is not limited to this embodiment or to the particular configuration mentioned. It will be apparent to those skilled in the art that our cell pressure-sensing battery case could have extensive use in other operations where it is necessary to provide effective pressure monitoring or limiting means for objects in remote or inaccessible areas with little additional weight or bulk over unmonitored objects.

Having thus set forth and disclosed the nature of our invention, what we claim and desire to secure by Letters Patent of the United States is:

1. A pressure-sensing battery case structure for use with a multi-cell gas-tightly sealed battery, said battery case comprising an inverted rigid body forming the upper portion thereof, said rigid body including end plates, longitudinal bars connecting said end plates and corner brackets attached between the longitudinal bars and the end plates, strain gauge means attached to the surface of said longitudinal bars at the central portion thereof, a base plate forming the lower portion of said battery case, upstanding end members on the outer ends of said base plate for effectively contacting the lower portion of said end plates of said rigid body operating as pivot points therefor, a plurality of cell walls between each of the cells to form a fluid-tight seal therebetween, the lower ends of said cell walls being attached to said base plate effectively producing a hinge arrangement, rigid top and bottom members in each of the cells to make the cells substantially incompressible, said end plates and said top and bottom members being operatively positioned to maintain the cells in a gas-tight condition, and electronic circuit means for detecting the strain in at least one of said longitudinal bars produced by the forces in the battery case acting on the strain gauge means, the strain in said longitudinal bars being proportional to the pressure developed in the multi-cell battery case by the cell with the highest operating pressure.

2. The pressure-sensing battery case structure defined in claim 1 wherein each of said plurality of cell walls between each of the cells includes heat sink fins positioned adjacent thereto.

3. The pressure-sensing battery case structure defined in claim 1 wherein the central portion of said longitudinal bars where said strain gauge means is attached is reduced in cross-sectional area to increase the response of said strain gauge means to pressure development in the cells of said battery case.

4. The pressure-sensing battery case structure defined in claim 1 wherein said electronic circuit means for detecting the strain in said longitudinal bar includes a strain gauge bridge formed by two temperature compensated bridge halves, an adjustable biasing network for unbalancing the bridge and making its output voltage negative, and a differential operational amplifier operatively connected to said bridge for amplifying the output voltage from said bridge such that the signal from said amplifier is maximum when a predetermined strain limit is reached in said longitudinal bar.

* * * * *